United States Patent [19]

Hohman et al.

[11] 4,330,316

[45] May 18, 1982

[54] METHOD OF PREHEATING GLASS PELLETS

[75] Inventors: Charles M. Hohman, Granville; Mark A. Propster, Gahanna; Stephen Seng, Frazeysburg, all of Ohio

[73] Assignee: Owens-Corning Fiberglas Corporation, Toledo, Ohio

[21] Appl. No.: 216,464

[22] Filed: Dec. 15, 1980

[51] Int. Cl.³ .............................................. C03B 3/00
[52] U.S. Cl. ........................................... 65/27; 65/2; 65/29; 65/134; 65/335
[58] Field of Search .................... 65/27, 134, 335, 2, 65/29

[56] References Cited

U.S. PATENT DOCUMENTS

| | | | |
|---|---|---|---|
| 4,225,332 | 9/1980 | Tsay | 65/27 X |
| 4,238,216 | 12/1980 | Nevard | 65/134 |
| 4,248,615 | 2/1981 | Seng et al. | 65/335 X |
| 4,248,616 | 2/1981 | Seng et al. | 65/335 |

*Primary Examiner*—Robert L. Lindsay, Jr.
*Attorney, Agent, or Firm*—Ronald C. Hudgens; Patrick P. Pacella; Philip R. Cloutier

[57] ABSTRACT

A method of preheating glass batch pellets in which a controlled first stream of hot gases is employed to pre-dry pellets and a second stream of hot gases is employed to preheat the pellets and in which the two streams are combined and withdrawn from the system.

5 Claims, 1 Drawing Figure

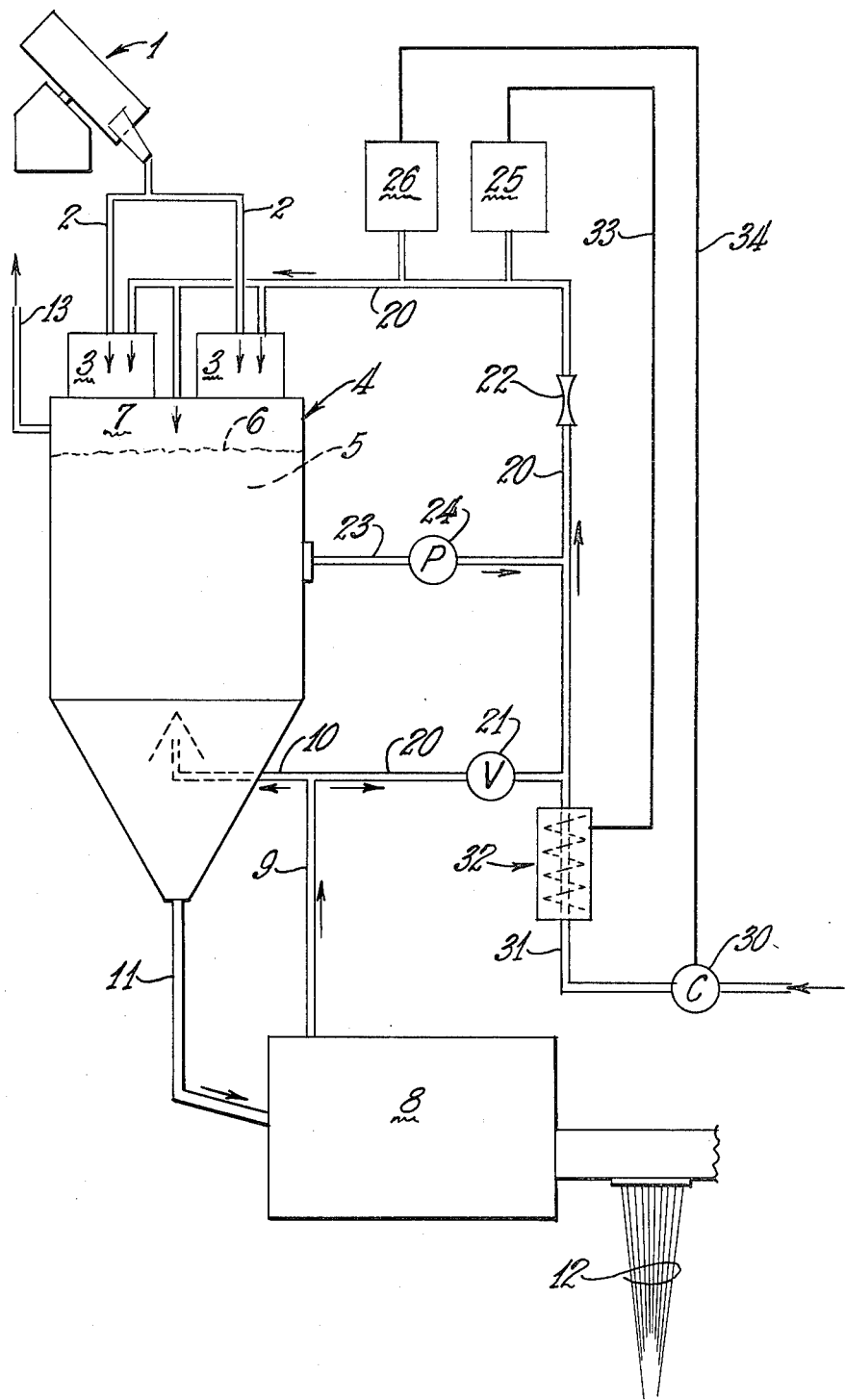

METHOD OF PREHEATING GLASS PELLETS

TECHNICAL FIELD

This invention relates to a method of preheating glass batch pellets.

In one of its more specific aspects, this invention relates to an improvement in the preheating of glass batch pellets in which the predrying operation and particulate emission are better controlled.

BACKGROUND OF THE INVENTION

In the production of glass fibers, it is customary to pelletize the particulate glass batch employing an aqueous solution. The wet pellets are then predried and preheated in a hopper through which they move downwardly as a bed which contacts an upwardly moving mass of hot gases. These gases frequently are products of combustion from the furnace in which the pellets are subsequently melted. The preheated pellets are then introduced into the furnace in which they are melted to form molten glass from which glass fibers can be formed.

Certain difficulties are frequently encountered with such a process. One difficulty involves the tendency of the pellets to cake in the upper portion, or the drying section, of the hopper. A second difficulty involves particulate carry-over in the hot gas stream emitted from the hopper. The present invention is directed to the solution of these problems and has, as one of its objects, the attainment of those operating conditions particularly necessary to prevent pellet agglomeration, as set forth in U.S. application Ser. No. 095,870, now U.S. Pat. No. 4,248,615 to S. Seng et al., the disclosure of which is incorporated herein be reference.

STATEMENT OF THE INVENTION

According to this invention, there is provided a process for preheating glass batch pellets comprising introducing wet pellets into a predryer; introducing a first stream of the hot gases into the predryer; passing the pellets and the hot gases downwardly in concurrent flow into a pellet hopper containing a downwardly moving bed of pellets; maintaining a pellet free space in the hopper above the pellet bed; passing a second stream of hot gases upwardly in the hopper countercurrently to the downwardly moving bed of pellets; and, withdrawing the first and the second streams of gases from the free space of the hopper.

In one embodiment of this invention, the first stream of hot gas will comprise hot combustion gases and an extraneous gas.

In another embodiment of this invention, the temperature of the extraneous gas stream will be controlled responsive to the temperature of the total gas stream to the predryer.

In another embodiment of this invention, the quantity of the extraneous gas stream will be controlled responsive to the dew point of the total gas stream to the predryer.

In another embodiment of this invention, a portion of the second stream of hot gases will be withdrawn from the hopper and introduced into the first stream of hot gases introduced into the predryer.

DESCRIPTION OF THE DRAWINGS

The method of this invention will be more easily understood if explained in conjunction with the attached drawing which is a schematic representation of the invention.

Referring now to the drawing, there is shown pelletizer 1 into which particulate glass batch will be pelletized and from which green, or wet, pellets will be introduced through conduit 2 into one or more predryers 3. Also introduced into the predryers by means of conduit 20 will be an after-defined first hot gas stream.

Within the predryer, the contact between the hot gas stream and the pellets will be such that a principal portion of the aqueous pellet solution is removed from the pellets. A sufficient quantity of the first hot gas stream is introduced such that the gas stream will pass downwardly at a significantly greater velocity than that of the bed of pellets, both of which move downwardly and into pellet hopper 4 positioned in open communication with the predryer.

Pellet hopper 4 will operate with pellet bed 5 positioned therein, the bed comprising the pellets descended from the predryers. The bed in the hopper will have an upper operating level 6 above which there will exist free space 7. The bed will move downward and into contact with hot gas introduced, generally, as the products of combustion from furnace 8 and introduced upwardly through conduits 9 and 10. The preheated pellets will leave the hopper through conduit 11, and will enter the furnace where they will be melted to form melted glass which will be formed by fiber forming means into fibers 12. The hot gases, introduced through conduit 10, after passing upwardly through the hopper, will leave at a locus above the bed level through conduit 13.

In order to solve the aforementioned problems, the present invention will control the temperature, dew point and quantity of hot gases which will be used in the predrying portion of the process.

Some portion of the hot gases employed can be by-passed around the hopper by conduit 20 and introduced into the predryers. The quantity so bypassed can be controlled by valve 21 and measured by gas flow measuring means 22. Conduit means will also be provided as a bypass for a desired quantity of the gases to be withdrawn from the hopper, by means of gas pump 24, into conduit 20. The temperature of the gas passing through conduit 20 will be meansured by gas temperature sensing means 25 and the dew point of the stream will be measured by dew point sensing means 26.

In order to affect the quantity, temperature and dew point of the gas stream introduced through conduit 20 to the predryers, a source of an extraneous gas, such as air, carbon dioxide, nitrogen, but preferably air, will be provided. This source can be provided at a suitable pressure by compressor means 30 which will discharge through conduit 31 into heater 32.

Heater 32, responsive to the gas temperature sensing means via conduit 33, will be of any suitable type capable of adjusting the temperature of the extraneous gas stream to a desired value responsive to the predetermined temperature at which gas temperature sensing means 25 is set. Any of the usual temperature increasing means can be employed, such as resistance heaters, gas fired heaters and the like, to heat the extraneous gas stream so that, in combination with the two gas streams with which it will be mixed, the total gas stream introduced into the predryers will be at the desired temperature.

In a similar manner, the quantity of the extraneous gas stream, responsive to the dew point sensor means via conduit 34, will be adjusted to a desired value responsive to the predetermined dew point at which dew point sensor means 26 will be set. Since the dew point of the extraneous gas stream will be the lowest dew point of the various streams making up the total gas stream to the predryers, the quantity of the extraneous gas stream will be adjusted to provide the desired dew point of the total gas stream introduced into the predryers.

The gas stream entering the predryers will pass downwardly with the pellets therein into the free space above the pellet bed operating level in the pellet hopper. This method of introduction of the gas stream through the predryers will reduce particulate emission by reducing, drastically, the total gas passed upwardly through the predryers in conventional operations.

It will be evident from the foregoing that various modifications can be made to this invention. Such, however, are considered within the scope of the invention.

We claim:

1. A process for preheating glass pellets which comprises:
    (a) introducing wet pellets into a predryer;
    (b) introducing a first stream of hot gases comprising hot combustion gases and air into said predryer, the temperature of said air being controlled responsive to the temperature of said first stream, the quantity of said air being controlled responsive to the dew point of said first stream;
    (c) passing said pellets and said first stream concurrently downward into a hopper to form a downwardly moving bed of pellets;
    (d) passing a second stream of hot gases upwardly into said hopper countercurrently to said downwardly moving bed of pellets; and,
    (e) withdrawing gases from the upper portion of said hopper and preheated pellets from the lower portion of said hopper.

2. The method of claim 1 in which a portion of said second stream of hot gases is withdrawn from said hopper and introduced into said first stream of hot gases.

3. The method of claim 2 in which a portion of said second stream is bypassed around said hopper.

4. The process of claim 1 in which said first stream of hot gas comprises hot gases withdrawn from said hopper.

5. The process of claim 1 in which said first stream is moved downwardly through said predryer at a rate greater than the rate at which said pellets move downwardly through said hopper.

* * * * *